E. A. PFLUEGER.
ARTIFICIAL BAIT.
APPLICATION FILED MAY 12, 1911.
1,007,007.
Patented Oct. 24, 1911.
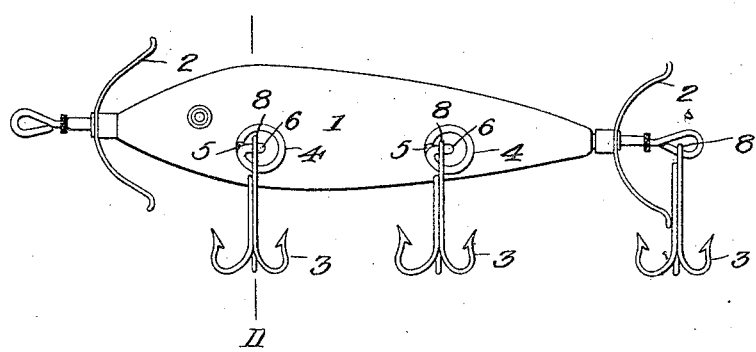
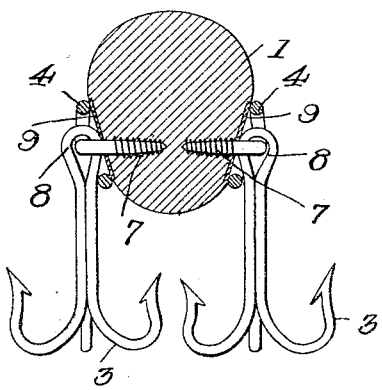
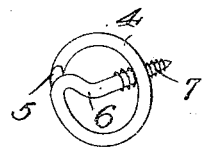
Witnesses
Inventor
Ernest A. Pflueger
By Percy B. Hills
Attorney

UNITED STATES PATENT OFFICE.

ERNEST A. PFLUEGER, OF AKRON, OHIO, ASSIGNOR TO THE E. A. PFLUEGER COMPANY, OF AKRON, OHIO, A CORPORATION OF OHIO.

ARTIFICIAL BAIT.

1,007,007.     Specification of Letters Patent.     Patented Oct. 24, 1911.

Application filed May 12, 1911. Serial No. 626,771

*To all whom it may concern:*

Be it known that I, ERNEST A. PFLUEGER, a citizen of the United States, residing at Akron, in the county of Summit and State of Ohio, have invented new and useful Improvements in Artificial Bait, of which the following is a specification.

My invention relates to artificial bait, and has for its objects certain improvements in the means for attaching the hooks to the body thereof as will be hereinafter more definitely pointed out, reference being had to the accompanying drawing, in which:—

Figure 1 is a side elevation of an artificial minnow having the hooks attached thereto by my improved means. Fig. 2 is a transverse sectional view, taken on the line II—II, Fig. 1.

Similar numerals of reference denote corresponding parts in the views.

In the said drawing the reference numeral 1 denotes the body of the device, shown in the form of a minnow, and which is provided with the usual revoluble lure devices 2, said body being finished in any suitable manner to attract the fish.

The hooks 3 employed may have any desired number of points, feathered or plain, and the same are detachably connected to the side of the body 1 each by a fastener formed preferably of spring wire of suitable material and temper, the same embodying a main portion 4 in the form of a closed circle or ring, which has one end preferably beveled at 5, and has its other end, where it overlips and is in spring contact with the beveled end 5, bent inwardly at 6 toward the center of the ring 4, at which point it is bent downward at 7 at a right angle to the plane of the ring 4, said portion 7 being pointed and screw-threaded to penetrate wood.

In assembling, the eye 8 on the shank of hook 3 is threaded onto ring 4 until it engages portion 6, whereupon the screw threaded end 7 is sunk into the body 1 at the desired point until the ring 4 is brought into contact with said body 1, and as the hook 3 is engaged with portion 6 its removal will be effectually prevented while the fastener is secured into the body 1, this result being aided if desired by forming on the body 1 at this point a flat spot to receive the ring 4.

I also employ beneath each ring 4 a small white or colored washer 9 of any suitable material, and of a size and shape corresponding to said ring 4, said washers being apertured centrally to permit the passage therethrough of the threaded ends 7. Said washers not only provide backgrounds or spots of contrast, which will add to the attractiveness and efficiency of the bait, but also serve to prevent the eyes 8 of the hooks and the fasteners from breaking the waterproof finish of the minnow 1.

By employing a fastener such as described the ring 4 thereof acts as a circular guard to maintain the points of the hook away from the body 1, thus preventing any scratching of the latter, while the engagement of the eye 8 of the hook with the portion 6 of the fastener holds the hook in position to receive strikes.

Having thus described my invention, what I claim and desire to secure by Letters Patent, is:—

1. In an artificial bait, the combination with a body, and a fish-hook, of a fastener for attaching said hook to said body shaped in ring form and having an inward radially projecting portion whose under surface lies at all points within the plane of the outer surface of said ring, and a centrally depending attaching point for penetrating said body.

2. In an artificial bait, the combination with a body, and a fish-hook, of a fastener of spring wire for attaching said hook to said body formed in a broken ring having one end beveled and underlying the other end and in spring contact therewith, the latter end emerging into an inwardly radially projecting portion whose under surface lies at all points within the plane of the outer surface of said ring, said portion being bent centrally of said ring at a right angle to form a point for penetrating said body.

In testimony whereof I have hereunto set my hand in the presence of two subscribing witnesses.

ERNEST A. PFLUEGER.

Witnesses:
F. W. CASTLE,
L. W. GRIFFITHS.